US012395435B2

(12) United States Patent
Mahadevan et al.

(10) Patent No.: US 12,395,435 B2
(45) Date of Patent: Aug. 19, 2025

(54) ROUTER AFFINITY IN SOFTWARE DEFINED WIDE AREA NETWORK(S)

(71) Applicant: Cisco Technology, Inc., San Jose, CA (US)

(72) Inventors: Satish Mahadevan, San Ramon, CA (US); Hamzah Shuaib Kardame, San Francisco, CA (US); Arsalan Arsalan, San Jose, CA (US); Tahir Ali, San Jose, CA (US); Mrigendra Singh Patel, Milpitas, CA (US); Basavaraju Halappa, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 232 days.

(21) Appl. No.: 18/150,702

(22) Filed: Jan. 5, 2023

(65) Prior Publication Data

US 2024/0236001 A1    Jul. 11, 2024

(51) Int. Cl.
*G06F 15/173* (2006.01)
*H04L 47/125* (2022.01)

(52) U.S. Cl.
CPC ................... *H04L 47/125* (2013.01)

(58) Field of Classification Search
CPC .................................................. H04L 47/125
See application file for complete search history.

(56) References Cited

U.S. PATENT DOCUMENTS

| | | | | |
|---|---|---|---|---|
| 2001/0052024 | A1* | 12/2001 | Devarakonda | H04L 67/1027 718/105 |
| 2009/0296711 | A1* | 12/2009 | Kennedy | H04L 45/121 370/392 |
| 2010/0057923 | A1 | 3/2010 | Petter | |
| 2012/0124237 | A1 | 5/2012 | Kennedy | |
| 2018/0131756 | A1 | 5/2018 | Sarrazin-Boucher | |
| 2021/0306261 | A1 | 9/2021 | Duan | |

OTHER PUBLICATIONS

Li Guoyan et al: "SON-Based LoadBalancing Scheme for Multi-Controlle-rDeployment", IEEE Access, vol. 7, Apr. 3, 2019 (Apr. 3, 2019), pp. 39612-39622, XP011717788, DOI: 10.1109/ACCESS. 2019.2906683 [retrieved on Apr. 3, 2019]paragraphs [SectionIII], [ Ilgori thmDesign 11 ].
Copy of the PCT Search Report and Written Opinion dated May 8, 2024 for PCT Application No. PCT/US2024/010076.

* cited by examiner

Primary Examiner — Padma Mundur
(74) Attorney, Agent, or Firm — Lee & Hayes, P.C.

(57) ABSTRACT

This disclosure describes techniques and mechanisms for utilizing affinity routing in SDWAN networks. The techniques may enable network administrators to assign and/or configure affinity numbers to hub(s) and/or gateway(s), tunneling interface(s), service(s), etc., as well as affinity-preference-order(s) to edge device(s) within the network. Network administrators may also configure control polic (ies). The techniques enable a scalable and simplified way to automatically load-balance traffic across different gateways within a network, while reducing network resource usage. The techniques may utilize routing affinity to achieve a variety of networking related functionalities, including automatic load-balancing of traffic, provisioning of active and backup gateways, optimal route distribution to routers from routing controllers, optimized service placement for edge routers, without the need for any policy configuration at all, let alone complex policies.

20 Claims, 5 Drawing Sheets

ROUTER AFFINITY IN SOFTWARE DEFINED WIDE AREA NETWORK(S)

TECHNICAL FIELD

The present disclosure relates generally to the field of computer networking, and more particularly to utilizing affinity routing to automatically load-balance traffic across different gateways within a SDWAN network without complex policies.

BACKGROUND

Computer networks are generally a group of computers or other devices that are communicatively connected and use one or more communication protocols to exchange data, such as by using packet switching. For instance, computer networking can refer to connected computing devices (such as laptops, desktops, servers, smartphones, and tablets) as well as an ever-expanding array of Internet-of-Things (IoT) devices (such as cameras, door locks, doorbells, refrigerators, audio/visual systems, thermostats, and various sensors) that communicate with one another. Modern-day networks deliver various types of networks, such as Local-Area Networks (LANs) that are in one physical location such as a building, Wide-Area Networks (WANs) that extend over a large geographic area to connect individual users or LANs, Enterprise Networks that are built for a large organization, Internet Threat and compliance data provider (ISP) Networks that operate WANs to provide connectivity to individual users or enterprises, software-defined networks (SDNs), wireless networks, core networks, cloud networks, and so forth.

These networks often include specialized network devices to communicate packets representing various data from device-to-device, such as switches, routers, servers, access points, and so forth. Each of these devices is designed and configured to perform different networking functions. For instance, switches may allow devices in a network to communicate with each other. Routers connect multiple networks together, and also connect computers on those networks to the Internet, by acting as a dispatcher in networks by analyzing data being sent across a network and choosing an optimal route for the data to travel. Access points act like amplifiers for a network and serve to extend the bandwidth provided by routers so that the network can support many devices located further distances from each other.

One example network is a software defined wide area network (SDWAN). In SDWAN networks, when border router(s) and/or transport gateways are deployed in a scale-out manner, capacity planning and load distribution becomes challenging. For instance, including multiple gateways introduces capacity constraints and requires load balancing. Further, when a primary gateway fails, backup gateways may be implemented. However, current techniques utilize complex control policies, which are resource intensive and difficult to maintain on an ongoing basis.

In some examples, the network may implement send-path-limits. However, send-path-limits have various constraints. For instance, even when the send-path-limit is a high value, a routing controller may choose to send non-preferred routes to branches versus preferred routers. Further, higher send-path-limits require more resources, making scaling of a network difficult. Alternatively, where the send-path-limit is a lower value, there is a lack of determinism, such that a preferred route may never be selected and/or received by an edge router (e.g., edge device).

In some examples, such as when services like firewall/IDS are deployed behind multiple SDWAN routers, edge routers to have a certain affinity/preference to specific firewall/IDS instances rather than others (e.g., such as based on location proximity). However, affinity and/or preference is generally achieved by complex control policies that are resource intensive, resulting in degraded network performance.

Further, since edge routers in an SDWAN network receive routes from most other gateways, they establish SDWAN tunnels to all of the gateways, including gateways that are not preferred. This not only is resource intensive but also affects tunnel scale on the edge routers.

Accordingly, there is a need for a simplified way to preserve resources and automatically load-balance traffic across different gateways without any control policies within a network.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
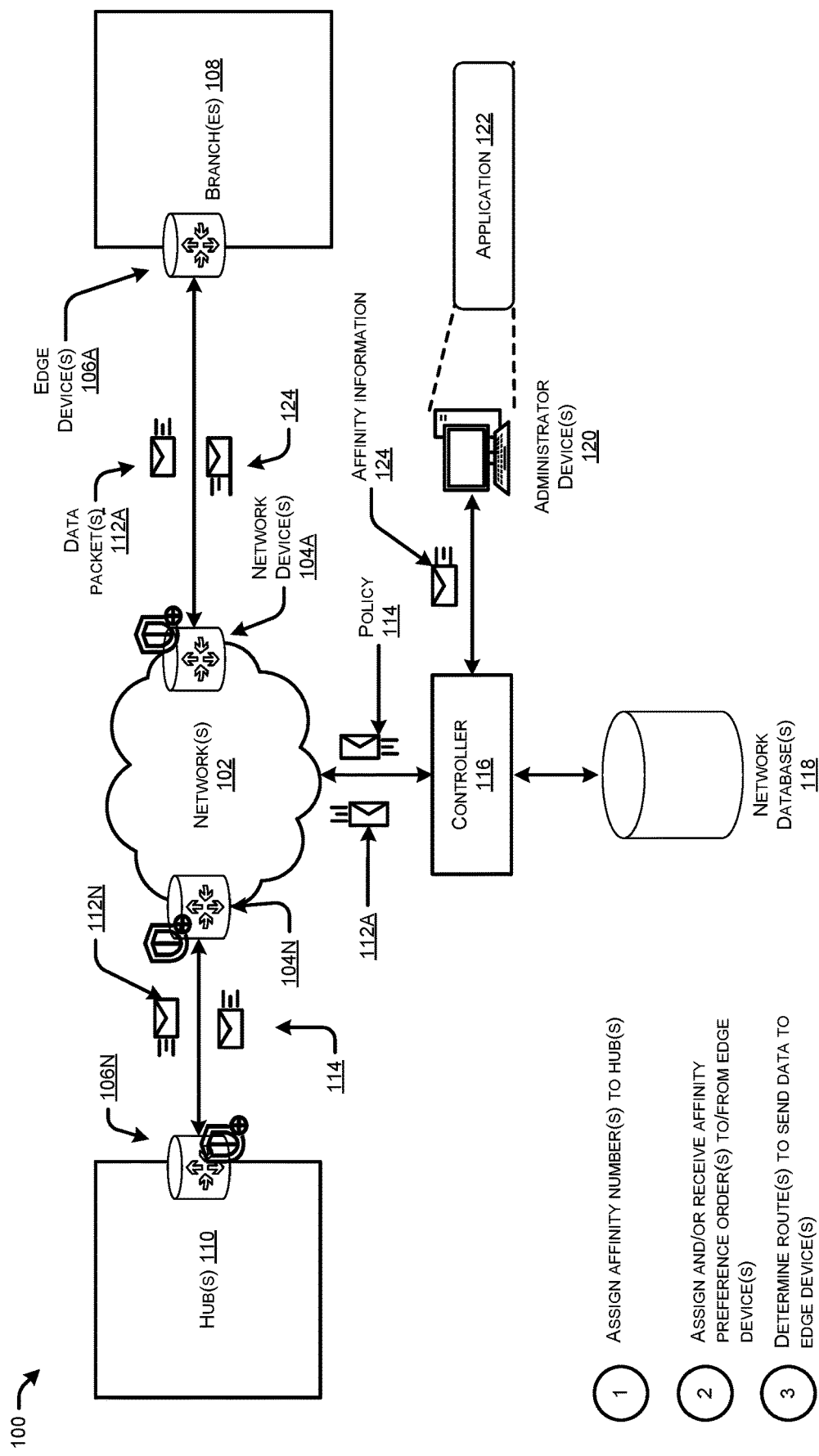
FIG. 1 illustrates a system-architecture diagram of an environment in which a system can utilize affinity routing in SDWAN networks.

The present disclosure relates generally to the field of computer networking, and more particularly to utilizing affinity routing to automatically load-balance traffic across different gateways within a SDWAN network without complex policies.

A method to perform the techniques described herein may be implemented at least in part by a controller of a network and may include assigning, to one or more first gateways in the network, a first affinity number. The method may include assigning to one or more second gateways in the network, a second affinity number. Further the method may include receiving, from an edge router in the network, an affinity preference order associated with the edge router. Additionally, the method may include determining, based at least in part on the affinity preference order, a route associated with the first affinity number to send a path to the edge router. The method may also include sending, based at least in part on the determining, the path to the edge router via the route.

Additionally, any techniques described herein, may be performed by a system and/or device having non-transitory computer-readable media storing computer-executable instructions that, when executed by one or more processors, performs the method(s) described above and/or one or more non-transitory computer-readable media storing computer-readable instructions that, when executed by one or more processors, cause the one or more processors to perform the method(s) described herein.

Example Embodiments

Computer networks are generally a group of computers or other devices that are communicatively connected and use one or more communication protocols to exchange data, such as by using packet switching. For instance, computer networking can refer to connected computing devices (such as laptops, desktops, servers, smartphones, and tablets) as well as an ever-expanding array of Internet-of-Things (IoT) devices (such as cameras, door locks, doorbells, refrigerators, audio/visual systems, thermostats, and various sensors) that communicate with one another. Modern-day networks deliver various types of networks, such as Local-Area Networks (LANs) that are in one physical location such as a building, Wide-Area Networks (WANs) that extend over a large geographic area to connect individual users or LANs, Enterprise Networks that are built for a large organization, Internet Service Provider (ISP) Networks that operate WANs to provide connectivity to individual users or enterprises, software-defined networks (SDNs), wireless networks, core networks, cloud networks, and so forth.

These networks often include specialized network devices to communicate packets representing various data from device-to-device, such as switches, routers, servers, access points, and so forth. Each of these devices is designed and configured to perform different networking functions. For instance, switches may allow devices in a network to communicate with each other. Routers connect multiple networks together, and also connect computers on those networks to the Internet, by acting as a dispatcher in networks by analyzing data being sent across a network and choosing an optimal route for the data to travel. Access points act like amplifiers for a network and serve to extend the bandwidth provided by routers so that the network can support many devices located further distances from each other.

One example network is a software defined wide area network (SDWAN). In SDWAN networks, when border router(s) and/or transport gateways are deployed in a scale-out manner, capacity planning and load distribution becomes challenging. For instance, including multiple gateways introduces capacity constraints and requires load balancing. Further, when a primary gateway fails, backup gateways may be implemented. However, current techniques utilize complex control policies, which are resource intensive and difficult to maintain on an ongoing basis.

In some examples, the network may implement send-path-limits. However, send-path-limits have various constraints. For instance, even when the send-path-limit is a high value, a routing controller may choose to send non-preferred routes to branches versus preferred routers. Further, higher send-path-limits require more resources, making scaling of a network difficult. Alternatively, where the send-path-limit is a lower value, there is a lack of determinism, such that a preferred route may never be selected and/or received by an edge router (e.g., edge device).

In some examples, such as when services like firewall/IDS are deployed behind multiple SDWAN routers, edge routers to have a certain affinity/preference to specific firewall/IDS instances rather than others (most likely based on location proximity). However, affinity and/or preference is generally achieved by complex control policies that are resource intensive, resulting in degraded network performance.

Further, since edge routers in an SDWAN network receive routes from most other gateways, they establish SDWAN tunnels to all of the gateways, including gateways that are not preferred. This not only is resource intensive but also affects tunnel scale on the edge routers.

Accordingly, there is a need for a simplified way to preserve resources and automatically load-balance traffic across different gateways without any control policies within a network.

This disclosure describes techniques and mechanisms for utilizing affinity routing to automatically load-balance traffic across different gateways within a SDWAN network without complex policies. In some examples, the system may assign, to one or more first gateways in the network, a first affinity number. The system may assign to one or more second gateways in the network, a second affinity number. The system may receive, from an edge router in the network, an affinity preference order associated with the edge router. In some examples, the system may determine, based at least in part on the affinity preference order, a route associated with the first affinity number to send a path to the edge router. Additionally, the system may send, based at least in part on the determining, the path to the edge router via the route.

In some examples, the system may configure one or more gateways and/or hub(s) to comprise one or more affinity numbers. For instance, a first gateway and a second gateway may be assigned and/or configured to have the affinity number 1. A third gateway and a fourth gateway may be assigned and/or configured to have the affinity number 2. A fifth gateway and a sixth gateway may be assigned and/or configured to have the affinity number 3. A seventh gateway and an eighth gateway may be assigned and/or configured to have the affinity number 4. In some examples, each route originating from a particular gateway is tagged with the configured and/or assigned affinity number (e.g., route(s) from the first gateway and/or second gateway are tagged with the affinity number 1, etc.).

In some examples, an affinity-preference-order is configured on the edge routers (e.g., edge device(s)) as an ordered list. For instance, affinity-preference-order(s) may be configured by a network administrator, such as during capacity planning of the network. In some examples, a first edge device may be configured to have an affinity-preference-order of [1,2,3,4]. In this example, the first edge device is configured to prefer tagged with affinity number 1 first. In some examples, such as in the absence of routes tagged with the affinity number 1, the first edge device may then failover to routes tagged with affinity number 2 and so on to affinities to 3 and 4. In some examples, a second edge device may be configured to have an affinity-preference-order of [2,1,4,3]. In this example, the edge device is configured to prefer tagged with affinity number 2 first. In some examples, such as in the absence of routes tagged with the affinity number 2, the edge device may then failover to routes tagged with affinity number 1 and so on to affinities to 4 and 3. In some examples, the first edge device may be associated with a first branch and the second edge device may be associated with a second branch of the network.

Accordingly, different branch(es) within the network may be configured to prefer a different hub, have a different affinity-preference-order, and have different load balancing. In this way, routing affinity can be used to achieve a variety of networking related functionalities, including automatic load-balancing of traffic, provisioning of active and backup gateways, optimal route distribution to routers from routing controllers, optimized service placement for edge routers, without the need for any policy configuration at all, let alone complex policies. Thus, without requiring resource intensive and/or complex control policies to be configured by an administrator and/or a controller, the current techniques may automatically load-balance traffic (e.g., from edge routers and/or edge device(s)) across different gateways within the network.

In some examples, the system may store affinity-preference-orders locally at each edge device. In some examples, the system may use this locally stored information to do fast-failover to backup when necessary, without waiting for any updates from a controller (e.g., such as a routing controller). In some examples, the system may comprise a controller (e.g., such as a routing controller). In some examples, the edge device(s) may communicate their affinity-preference-order(s) to the controller. In some examples, the controller may store affinity data, including each edge device(s) affinity-preference-order in memory and/or a database associated with the network. In some examples, an edge device may send an affinity-preference-order of [1,2]. In this example, the controller may be configured to determine that the edge device does not want route associated with affinity numbers 3, 4, etc. In this example, the controller may filter out routes that are tagged with affinity numbers other than 1 or 2.

Accordingly, when the controller distributes and/or sends routes to the edge device, the controller may automatically filter out routes that are not included in the affinity-preference-order of the edge router.

In some examples, the controller may be configured to intelligently determine the order in which routes may be send to the edge device. As noted above, current techniques associated with hubs distributing routes to branch(es) within a network lack determinism with regard to which paths are sent first. Accordingly, with current techniques, if a send-path-limit is hit, paths stop being sent, resulting in an edge device not receiving a preferred route.

In contrast to current techniques, the controller described herein may utilize the affinity-preference-order of the edge device to determine routes to send first. For instance, where the affinity-preference-order for the edge device is [1,2], the controller may be configured to identify and send routes with the affinity number 1 as much as possible. In this example, the controller may only send routes with the affinity number 2 where there are no other affinity number 1 routes and/or paths. In some examples, such as where the controller hits a send-path-limits before running out of affinity 1 routes, the controller may stop distributing routes, such that no routes may be sent via affinity 2 paths. As noted above, the controller may store affinity data. In some examples, the affinity data may further comprise routing information based inbound site (RIB-INS) data and/or RIB-outbound site (OUT) data. The controller may group RIB-INS data by affinity group to utilize when selecting routes.

In this way, the system may provide a deterministic controller. Further, the system may utilize a lower the send-path-limit, while still ensuring that edge device(s) receive preferred routes, resulting in reduced memory and/or processing requirements of network device(s). As noted above, this may result in improved processing and resource availability within the network. Moreover, the system may avoid expensive computations in the routing controller during RIB-OUT processing. Further, the system may ensure that, always in a deterministic fashion, only the most relevant paths to the branch actually get sent out.

In some examples, the system may comprise a services module. In some examples, the services module may be configured to determine affinity numbers associated with service routes within a network. For example, service routes that are advertised from network routes (e.g., SDWAN routes, hubs, etc.) also be tagged with the configured affinity number of the hub. In some examples, the services module may receive a service request and/or service advertisement for a service (e.g., such as firewall, IDS, etc.). The services module may determine an affinity number associated with the service request. The services module may determine an affinity-preference-order associated with an edge device that provides the service. In some examples, the services module may apply the affinity-preference-order to the service route. In this way, the system ensures that affinity-preference-orders of edge devices are honored for services. Accordingly, the system may enable edge devices to have a preference/affinity to a particular service (e.g., firewall, IDS, etc.), purely by virtue of the affinity number and affinity-preference-order configurations (e.g., without complex control policies).

In some examples, the system may comprise a tunneling module. In some examples, the tunneling module may be configured to distribute tunnel routes (e.g., TLOC routes, etc.) to specific endpoints (e.g., using any tunneling forwarding policy). In this example, the tunneling module may be configured apply the affinity-preference-order of the edge device to the tunneling forwarding policy. For example, tunnel interface(s) of a hub may be tagged with affinity numbers. In this example, an edge device may have an affinity-preference-order of [1,2], which may be sent to the controller. Accordingly, when the controller distributes tunnel routes to the edge device, the tunneling module may be configured to automatically filter out tunnel routes that have affinity numbers other than 1 or 2. In this way, the edge device may be prevented from forming unnecessary tunnels (e.g., SDWAN tunnels, etc.), such that there is reduced tunnel scale pressure on the edge device.

In some examples, the system may comprise a policy module. In some examples, the policy module may be configured to assign an affinity-number for a route as an action in a control policy sequence. For example, a first hub with the affinity number 1 within the network may send a first prefix and a second prefix to the controller. In this example, the first prefix and the second prefix are each tagged with the affinity number 1. In some examples, the policy module may be configured with a policy that specifies, for to first prefix keep the affinity number as 1 and specifies, for the second prefix, to update and/or assign the affinity number 2. Accordingly, the policy module may be configured to dynamically, based on policy, override tagged prefix(es) from hub(s).

In this way, the system provides improved flexibility such that the same hub can send routes with different affinities. Further, the affinities may be configured to be changed and/or defined at a prefix level or VPN level. In some examples, the per-prefix affinity concept may be used to select different affinit(ies) for different application endpoints. Thus, this allows more flexible and granular affinity number assignment to routes.

Accordingly, the techniques described herein may utilize routing affinity to achieve a variety of networking related functionalities, including automatic load-balancing of traffic, provisioning of active and backup gateways, optimal route distribution to routers from routing controllers, optimized service placement for edge routers, without the need for any policy configuration at all, let alone complex policies.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram of an environment in which a system 100 can utilizing affinity routing to automatically load-balance traffic across different gateways within a network. While the system 100 shows an example controller 116, it is understood that any of the components of the system may be implemented on any device in the network 102.

In some examples, the system 100 may include a network 102 that includes network devices 104. The network 102 may include one or more networks implemented by any viable communication technology, such as wired and/or wireless modalities and/or technologies. The network may include any combination of Personal Area Networks (PANs), software defined cloud interconnects (SDCI), Local Area Networks (LANs), Campus Area Networks (CANs), Metropolitan Area Networks (MANs), extranets, intranets, the Internet, short-range wireless communication networks (e.g., ZigBee, Bluetooth, etc.), Wide Area Networks (WANs)—both centralized and/or distributed, software defined WANs (SDWANs)—and/or any combination, permutation, and/or aggregation thereof. The network 102 may include devices, virtual resources, or other nodes that relay packets from one network segment to another by nodes in the computer network. The network 102 may include multiple devices that utilize the network layer (and/or session layer, transport layer, etc.) in the OSI model for packet forwarding, and/or other layers.

The system 100 may comprise a controller 116. In some examples, the controller 116 corresponds to a system that has complete visibility into the security fabric of a given network (e.g., enterprise network, smaller network, etc. In some examples, the controller 116 may comprise a memory, one or more processors, etc. In some examples, the controller 116 may comprise a routing controller. In some examples, the controller 116 may be integrated as part of Cisco's vSmart feature, Cisco's vManage feature, and/or included in a SDWAN architecture.

The controller 116 may be configured to communicate with one or more network device(s) 104. For instance, the controller 116 may receive network data (e.g., network traffic load data, network client data, etc.) or other data (e.g., application load data, data associated with WLCs, APs, etc.) from the network device(s) 104. The network device(s) 104 may comprise routers, switches, access points, stations, radios, and/or any other network device. In some examples, the network device(s) 104 may monitor traffic flow(s) within the network and may report information associated with the traffic flow(s) to the controller 116.

In some examples, the system comprises branch(es) 108 and/or hub(s) 110. In some examples, the branch(es) 108 comprise one or more user(s), mobile device(s), and/or Internet of Things (IoT) device(s) located at one or more locations. In some examples, the hub(s) 110 may comprise one or more network device(s) 104, gateway device(s) (also referred to herein as "gateways"), tunneling interfaces, etc.

In some examples, the branch(es) 108 communicate via edge device(s) 106. In some examples, the edge device(s) 106 comprise one or more routers, access point(s), and/or any other network device. In some examples, the edge device(s) 106 may comprise an ingress and/or egress router. In some examples, the network device(s) 104 may comprise a SDCI router and/or headend device. In some examples, the branch(es) 108 and/or hub(s) 110 communicate with each other, the controller 116, and/or cloud providers (e.g., SaaS, Internet, IaaS, etc.) via the network(s) 102.

In some examples, the edge device(s) 106 and/or network device(s) 104 may communicate information. For instance, the network device(s) 104 may send data packet(s) 112 associated with data flows to other network device(s) and/or edge device(s) 106. In some examples, the data packet(s) 112 and/or metadata associated with the data packet(s) 112 may be sent to and/or monitored by the controller 116.

In some examples, the controller 116 may be configured to monitor the packets 112. In some examples, the packets may comprise data (e.g., which application is used, by which station, traffic characteristics and duration, etc.) associated with network traffic and may store the data as part of the system and/or controller 116 (e.g., such as in a database and/or memory associated with the controller 116).

In some examples, administrator device(s) 120 may send affinity information 124 to the controller 116. In some examples, the affinity information may comprise configured affinity number(s) and/or affinity-preference-order(s). In some examples, the controller may send the affinity information 124 to one or more branch(es) 108 (e.g., one or more edge device(s) and/or router(s)) and/or hub(s) 110.

In some examples, the controller 116 may send policy information 114 and/or the affinity information 124 to the hub(s) 110 and/or branch(es) 108. In some examples, the policy information may comprise configured control polic(ies) associated with a particular prefix, as described above.

In some examples, the controller 116 may be configured to receive affinity data from one or more edge device(s) associated with one or more branch(es) 108. In some examples, the affinity data may comprise affinity number(s), affinity-preference-order(s) of each edge device, routing information based inbound site (RIB-INS) data and/or RIB-outbound site (OUT) data, groupings of RIB-INS data by affinity group, etc. In some examples, the controller 116 may store the affinity information, affinity data, policy information, and/or any other information in memory and/or a network database 118 associated with the network.

In some examples, the controller 116 may be configured to communicate with administrator device(s) 120. As illustrated, the administrator device(s) 120 may comprise an application 122. In some examples, the application 122 may correspond to an application provided by a service provider (e.g., such as Cisco) that enables an administrator of the network 102 to access the controller 116. For instance, the application 122 may correspond to Cisco's vSmart feature and/or Cisco's vManage feature.

At "1", the system may assign affinity number(s) to hub(s). For instance, each hub may comprise one or more gateway(s). In some examples, the system may configure one or more gateways to comprise one or more affinity numbers. For instance, a first gateway and a second gateway may be assigned and/or configured to have the affinity number 1. A third gateway and a fourth gateway may be assigned and/or configured to have the affinity number 2. A fifth gateway and a sixth gateway may be assigned and/or configured to have the affinity number 3. A seventh gateway and an eighth gateway may be assigned and/or configured to have the affinity number 4. In some examples, each route originating from a particular gateway is tagged with the configured and/or assigned affinity number (e.g., route(s) from the first gateway and/or second gateway are tagged with the affinity number 1, etc.). As noted above, the affinity number(s) may be assigned and/or configured by an administrator via administrator device(s) 120.

At "2", the system may assign and/or receive affinity-preference-order(s) to and/or from edge device(s). In some examples, an affinity-preference-order is configured on the edge routers (e.g., edge device(s)) as an ordered list. For instance, affinity-preference-order(s) may be configured by a network administrator, such as during capacity planning of the network. In some examples, a first edge device may be configured to have an affinity-preference-order of [1,2,3,4]. In this example, the first edge device is configured to prefer tagged with affinity number 1 first. In some examples, such as in the absence of routes tagged with the affinity number 1, the first edge device may then failover to routes tagged with affinity number 2 and so on to affinities to 3 and 4. In some examples, a second edge device may be configured to have an affinity-preference-order of [2,1,4,3]. In this example, the edge device is configured to prefer tagged with affinity number 2 first. In some examples, such as in the absence of routes tagged with the affinity number 2, the edge device may then failover to routes tagged with affinity number 1 and so on to affinities to 4 and 3. In some examples, the first edge device may be associated with a first branch and the second edge device may be associated with a second branch of the network.

As noted above, the system may store affinity-preference-orders locally at each edge device. In some examples, the system may use this locally stored information to do fast-failover to backup when necessary, without waiting for any updates from a controller (e.g., such as a routing controller). In some examples, the system may comprise a controller (e.g., such as a routing controller). In some examples, the edge device(s) may communicate their affinity-preference-order(s) to the controller. In some examples, the controller may store affinity data, including each edge device(s) affinity-preference-order in memory and/or a database associated with the network. In some examples, an edge device may send an affinity-preference-order of [1,2]. In this example, the controller may be configured to determine that the edge device does not want route associated with affinity numbers 3, 4, etc. In this example, the controller may filter out routes that are tagged with affinity numbers other than 1 or 2.

At "3", the system may determine route(s) to send data to edge device(s). In some examples, the system may determine the route(s) based at least in part on the affinity-preference-order of the edge device(s). For instance, in some examples, the controller may be configured to intelligently determine the order in which routes may be send to the edge device.

At "4", the system may send the data to the edge device(s) via the route(s). For instance, the controller described herein may utilize the affinity-preference-order of the edge device to determine routes to send first. For instance, where the affinity-preference-order for the edge device is [1,2], the controller may be configured to identify and send routes with the affinity number 1 as much as possible. In this example, the controller may only send routes with the affinity number 2 where there are no other affinity number 1 routes and/or paths. In some examples, such as where the controller hits a send-path-limits before running out of affinity 1 routes, the controller may stop distributing routes, such that no routes may be sent via affinity 2 paths. As noted above, the controller may store affinity data. In some examples, the affinity data may further comprise routing information based inbound site (RIB-INS) data and/or RIB-outbound site (OUT) data. The controller may group RIB-INS data by affinity group to utilize when selecting routes.

In this way, the system may the system may provide a deterministic controller. Further, the system may utilize a lower the send-path-limit, while still ensuring that edge device(s) receive preferred routes, resulting in reduced memory and/or processing requirements of network device(s). As noted above, this may result in improved processing and resource availability within the network. Moreover, the system may avoid expensive computations in the routing controller during RIB-OUT processing. Further, the system may ensure that, always in a deterministic fashion, only the most relevant paths to the branch actually get sent out.

Further, the system may utilize routing affinity to achieve a variety of networking related functionalities, including automatic load-balancing of traffic, provisioning of active and backup gateways, optimal route distribution to routers from routing controllers, optimized service placement for edge routers, without the need for any policy configuration at all, let alone complex policies.

Figure 2:
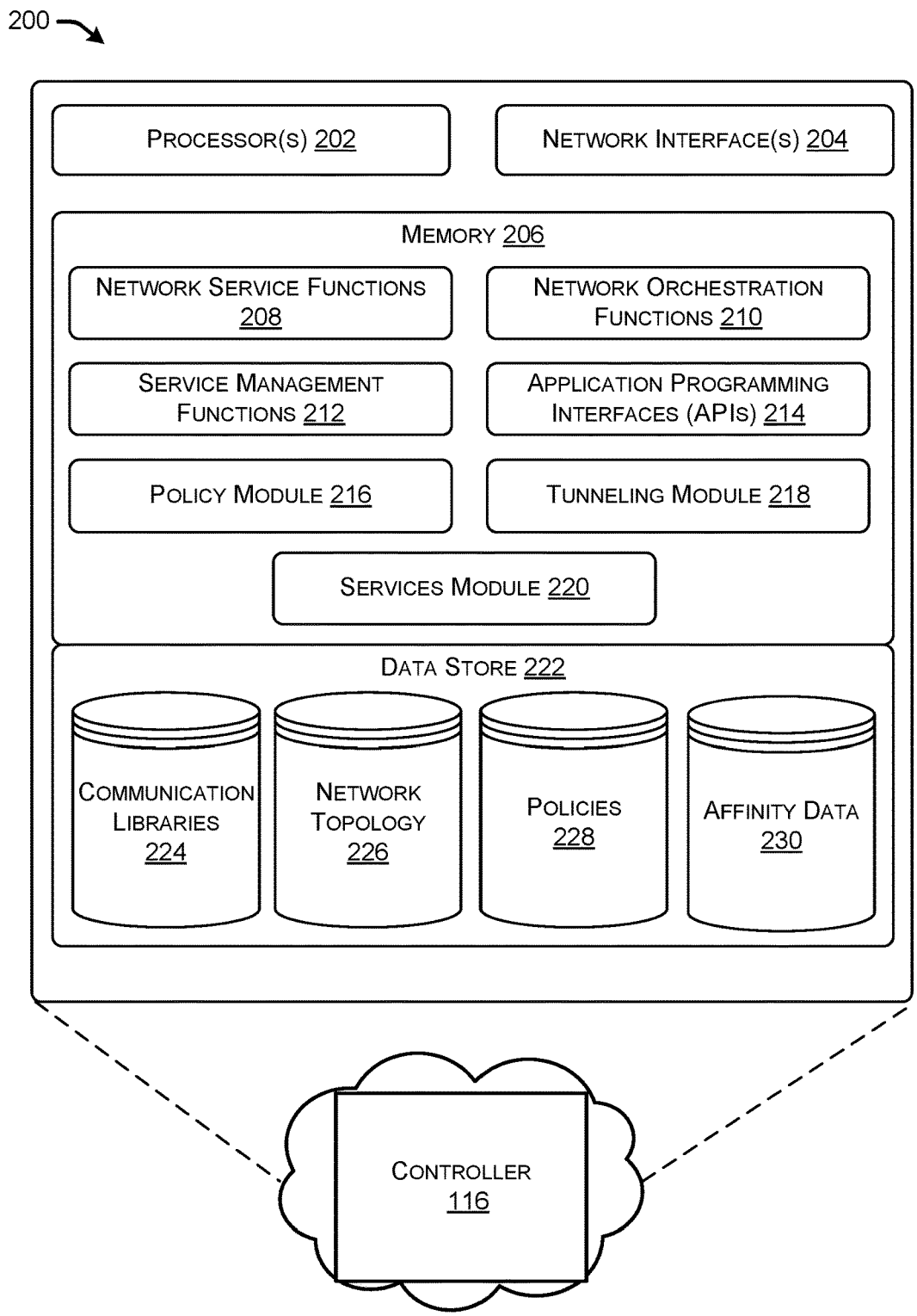
FIG. 2 illustrates a component diagram of an example controller described in FIG.

FIG. 2 illustrates a component diagram of an example monitoring system described in FIG. 1. In some instances, the controller 116 may run on one or more computing devices in, or associated with, the network 102 (e.g., a single device or a system of devices). In some instances, the controller 116 may be integrated as part of a cloud-based management solution (e.g., such as Cisco's vSmart feature and/or Cisco's vManage feature).

Generally, the controller 116 may include a programmable controller that manages some or all of the control plane activities of the network 102, and manages or monitors the network state using one or more centralized control models.

As illustrated, the controller 116 may include, or run on, one or more hardware processors 202 (processors), one or more devices, configured to execute one or more stored instructions. The processor(s) 202 may comprise one or more cores. Further, the controller 116 may include or be associated with (e.g., communicatively coupled to) one or more network interfaces 204 configured to provide communications with network device(s) 104, the edge device(s) 106 and other devices, and/or other systems or devices in the network 102 and/or remote from the network 102. The network interfaces 204 may include devices configured to couple to personal area networks (PANs), wired and wireless local area networks (LANs), wired and wireless wide area networks (WANs), SDWANs, SDCI's, and so forth. For example, the network interfaces 204 may include devices compatible with any networking protocol.

The controller 116 may also include memory 206, such as computer-readable media, that stores various executable components (e.g, software-based components, firmware-based components, etc.). The memory 206 may generally store components to implement functionality described herein as being performed by the controller 116. The memory 206 may store one or more network service functions 208, such as a slicing manager, a topology manager to manage a topology of the network 102, a host tracker to track what network components are hosting which programs or software, a switch manager to manage switches of the network 102, a process manager, and/or any other type of function performed by the controller 116.

The controller 116 may further include network orchestration functions 210 stored in memory 206 that perform various network functions, such as resource management, creating and managing network overlays, programmable APIs, provisioning or deploying applications, software, or code to hosts, and/or perform any other orchestration functions. Further, the memory 206 may store one or more service management functions 212 configured to manage the specific services of the network 102 (configurable), and one or more APIs 214 for communicating with devices in the network 102 and causing various control plane functions to occur.

Further, the controller 116 may include a policy module 216. In some examples, the policy module 216 enables may be configured to assign an affinity-number for a route as an action in a control policy sequence. For example, a first hub with the affinity number 1 within the network may send a first prefix and a second prefix to the controller. In this example, the first prefix and the second prefix are each tagged with the affinity number 1. In some examples, the policy module may be configured with a policy that specifies, for to first prefix keep the affinity number as 1 and specifies, for the second prefix, to update and/or assign the affinity number 2. Accordingly, the policy module may be configured to dynamically, based on policy, override tagged prefix(es) from hub(s).

The controller 116 may include a tunneling module 218. In some examples, the tunneling module may be configured to distribute tunnel routes (e.g., TLOC routes, etc.) to specific endpoints (e.g., using any tunneling forwarding policy). In this example, the tunneling module may be configured apply the affinity-preference-order of the edge device to the tunneling forwarding policy. For example, tunnel interface(s) of a hub may be tagged with affinity numbers. In this example, an edge device may have an affinity-preference-order of [1,2], which may be sent to the controller. Accordingly, when the controller distributes tunnel routes to the edge device, the tunneling module may be configured to automatically filter out tunnel routes that have affinity numbers other than 1 or 2. In this way, the edge device may be prevented from forming unnecessary tunnels (e.g., SDWAN tunnels, etc.), such that there is reduced tunnel scale pressure on the edge device.

In some examples, the controller may include a services module 220. In some examples, the services module may be configured to determine affinity numbers associated with service routes within a network. For example, service routes that are advertised from network routes (e.g., SDWAN routes, hubs, etc.) may also be tagged with the configured affinity number of the hub. In some examples, the services module may receive a service request and/or service advertisement for a service (e.g., such as firewall, IDS, etc.). The services module may determine an affinity number associated with the service request. The services module may determine an affinity-preference-order associated with an edge device that provides the service. In some examples, the services module may apply the affinity-preference-order to the service route. In this way, the system ensures that affinity-preference-orders of edge devices are honored for services. Accordingly, the system may enable edge devices to have a preference/affinity to a particular service (e.g., firewall, IDS, etc.), purely by virtue of the affinity number and affinity-preference-order configurations (e.g., without complex control policies).

In this way, the system provides improved flexibility such that the same hub can send routes with different affinities. Further, the affinities may be configured to be changed and/or defined at a prefix level or VPN level. Thus, this allows more flexible and granular affinity number assignment to routes.

The controller 116 may further include a data store 222, such as long-term storage, that stores communication libraries 224 for the different communication protocols that the controller 116 is configured to use or perform. Additionally, the data store 222 may include network topology data 226, such as a model representing the layout of the network components in the network 102 and/or data indicating available bandwidth, available CPU, delay between nodes, computing capacity, processor architecture, processor type(s), etc. The data store 222 may store policies 228 that includes security data associated with the network, security policies configured for the network, firewall policies, firewall configuration data, compliance policies configured for the network, policies associated with the control policy sequence(s), etc. The data store 222 may store affinity data 230 that includes affinity information, affinity number(s), grouping(s) of RIB-INS data and affinity number(s), affinity-preference-order(s), etc.

Figure 3:
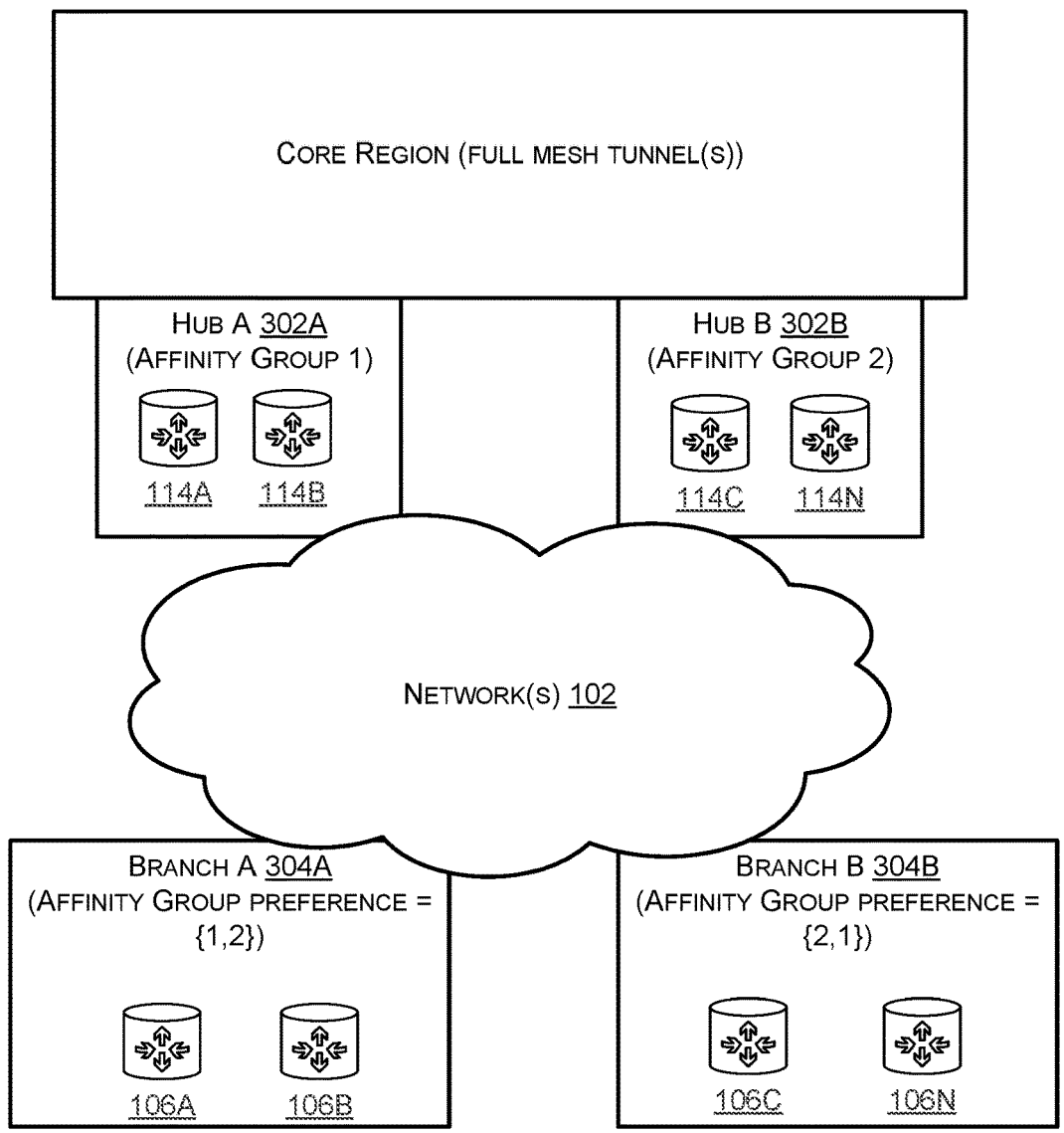
FIG. 3 illustrates an example environment associated with the system described in FIGS. 1-2.

FIG. 3 illustrates an example environment 300 associated with the system described in FIGS. 1-2. In some examples, the environment 300 may include a core region that comprises one or more full mesh tunnel(s).

As illustrated, the example environment 300 comprises a first hub 302A and a second hub 302B. The first hub 302A comprises a first network device 114A and a second network device 114B. The second hub 302B comprises a third network device 114C and a fourth network device 114N.

In some examples, the network device(s) 114 comprise gateway device(s) and/or gateway(s). As noted above, the gateway(s) 114 to comprise one or more affinity numbers. For instance, the first gateway 114A and the second gateway 114B of Hub A 302A may be assigned and/or configured to have the affinity number 1. The third gateway 114C and the fourth gateway 114N of Hub B 302B may be assigned and/or configured to have the affinity number 2.

In some examples, the hub(s) 302 may communicate with branch(es) 304 via the network 102. As illustrated, Branch A 304A may comprise edge device(s) 106A and 106B. Branch B may comprise edge device(s) 106C and 106N. As described above, an affinity-preference-order is configured on the edge routers (e.g., edge device(s)) as an ordered list. For instance, affinity-preference-order(s) may be configured by a network administrator, such as during capacity planning of the network. In some examples, the edge device(s) 106A, 106B of Branch A 304A may be configured to have an affinity-preference-order of [1,2]. In this example, the edge device(s) 106A, 106B of Branch A 304A are configured to prefer tagged with affinity number 1 first. In some examples, such as in the absence of routes tagged with the affinity number 1, the edge device(s) 106A, 106B of Branch A 304A may then failover to routes tagged with affinity number 2.

As illustrated, the edge device(s) 106C, 106N of Branch B 304B may be configured to have an affinity-preference-order of [2,1]. In this example, the edge device(s) 106C, 106N of Branch B 304B are configured to prefer tagged with affinity number 2 first. In some examples, such as in the absence of routes tagged with the affinity number 2, the edge device(s) 106C, 106N of Branch B may then failover to routes tagged with affinity number 1.

Accordingly, different branch(es) within the network may be configured to prefer a different hub, have different affinity-preference-order(s), and have different load balancing. Thus, without requiring resource intensive and/or complex control policies to be configured by an administrator and/or a controller, the current techniques may automatically load-balance traffic (e.g., from edge routers and/or edge device(s)) across different gateways within the network.

Figure 4:
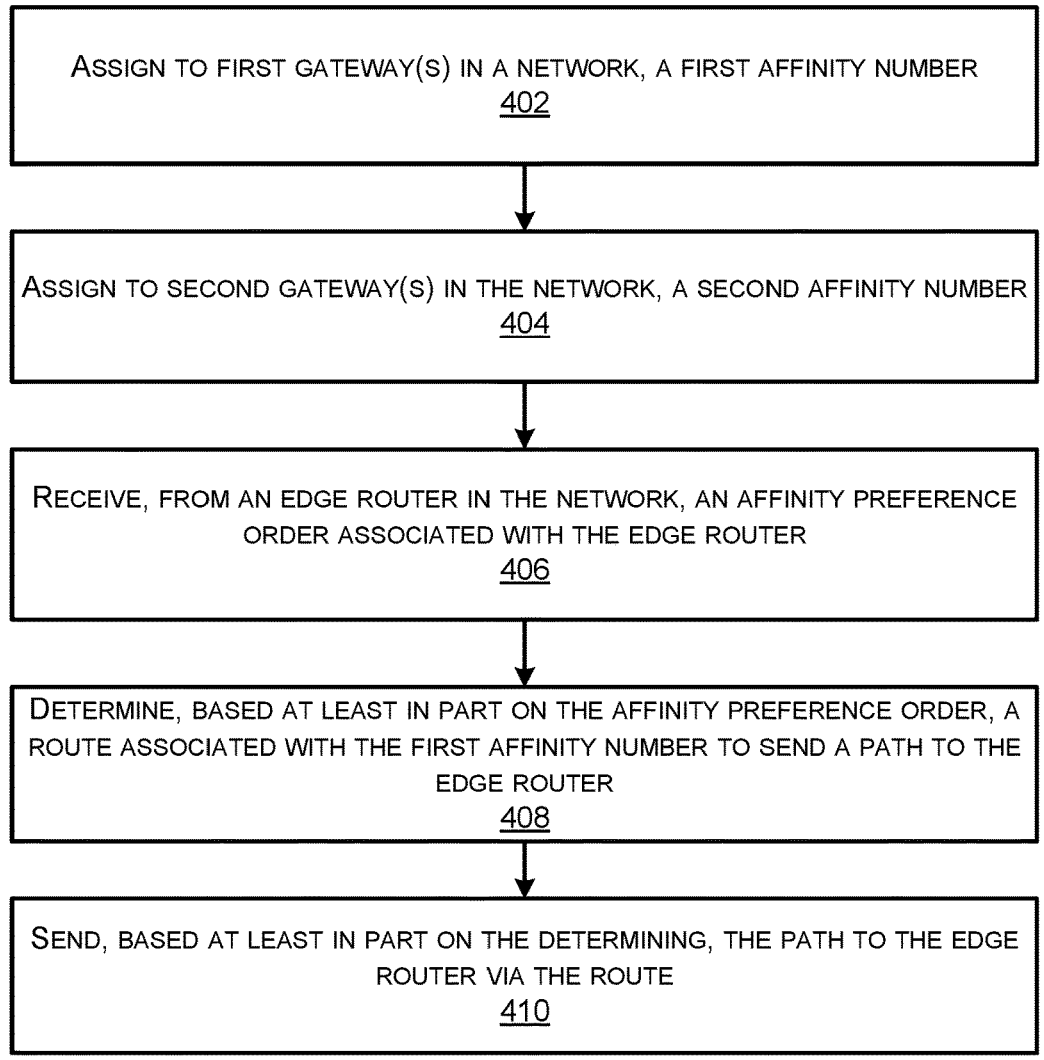
FIG. 4 illustrates a flow diagram of an example method for utilizing affinity routing associated with the system described in FIGS. 1-3.

FIG. 4 illustrates a flow diagram of an example system 400 for utilizing affinity routing within a network. In some instances, the steps of system 400 may be performed by one or more devices (e.g., controller 116, network device(s) 104, edge device(s) 106, etc.) that include one or more processors and one or more non-transitory computer-readable media storing computer-executable instructions that, when executed by the one or more processors, cause the one or more processors to perform operations of system 400.

At 402, the system may assign, to first gateway(s) in a network, a first affinity number. As noted above, in some examples, a hub 110 within the network 102 may comprise gateway(s). In some examples, the system may configure one or more gateways to comprise one or more affinity numbers. For instance, a first gateway and a second gateway may be assigned and/or configured to have the affinity number 1. A third gateway and a fourth gateway may be assigned and/or configured to have the affinity number 2. A fifth gateway and a sixth gateway may be assigned and/or configured to have the affinity number 3. A seventh gateway and an eighth gateway may be assigned and/or configured to have the affinity number 4. In some examples, each route originating from a particular gateway is tagged with the configured and/or assigned affinity number (e.g., route(s) from the first gateway and/or second gateway are tagged with the affinity number 1, etc.).

At 404, the system may assign to second gateway(s) in the network, a second affinity number. In some examples, the first gateway(s) and the second gateway(s) are associated with different hub(s). In some examples, the first gateway(s) and the second gateway(s) may be associated with a same hub.

At 406, the system may receive, from an edge router in the network, an affinity preference order associated with the edge router. For instance, as described above, an affinity-preference-order is configured on the edge routers (e.g., edge device(s)) as an ordered list. For instance, affinity-preference-order(s) may be configured by a network administrator, such as during capacity planning of the network. In some examples, a first edge device may be configured to have an affinity-preference-order of [1,2,3,4]. In this example, the first edge device is configured to prefer tagged with affinity number 1 first. In some examples, such as in the absence of routes tagged with the affinity number 1, the first edge device may then failover to routes tagged with affinity number 2 and so on to affinities to 3 and 4. In some examples, a second edge device may be configured to have an affinity-preference-order of [2, 1,4,3]. In this example, the edge device is configured to prefer tagged with affinity number 2 first. In some examples, such as in the absence of routes tagged with the affinity number 2, the edge device may then failover to routes tagged with affinity number 1 and so on to affinities to 4 and 3. In some examples, the first edge device may be associated with a first branch and the second edge device may be associated with a second branch of the network.

In some examples, the edge device(s) may communicate their affinity-preference-order(s) to the controller. In some examples, the controller may store affinity data, including each edge device(s) affinity-preference-order in memory and/or a database associated with the network. In some examples, an edge device may send an affinity-preference-order of [1,2]. In this example, the controller may be configured to determine that the edge device does not want route associated with affinity numbers 3, 4, etc. In this example, the controller may filter out routes that are tagged with affinity numbers other than 1 or 2.

In some examples, the system may group one or more inbound paths based at least in part on a respective affinity number associated with each path to create one or more groups. In some examples, the system may store the one or more groups in a database associated with the network.

At 408, the system may determine, based at least in part on the affinity preference order, a route associated with the first affinity number to send a path to the edge router. For instance, the system may intelligently determine the order in which routes may be send to the edge device. As noted above, current techniques associated with hubs distributing routes to branch(es) within a network lack determinism with regard to which paths are sent first. Accordingly, with current techniques, if a send-path-limit is hit, paths stop being sent, resulting in an edge device not receiving a preferred route.

At 410, the system may send, based at least in part on the determining, the path to the edge router via the route. In some examples, the path comprises an affinity associated with the edge router. In some examples, the affinity is based on the affinity preference order of the edge router.

In some examples, the system may send, to the edge router, one or more second paths, wherein the one or more second paths comprise one or more affinities associated with the edge router based on the affinity preference order. In some examples, the system may determine that a send-path-limit has been reached. In this example, the system may refrain from sending one or more third paths to the edge router based on the send-path-limit.

In some examples, the system may determine that the route associated with the first affinity number is unavailable. In this example, the system may determine, based at least in part on the affinity preference order, a second route associated with the second affinity number. The system may send a second path to the edge router via the second route. In some examples, the controller may provide input to the edge router indicating a selection of a path and/or performing a fast-failover function.

In some examples, determining the second route may occur locally at the edge router in a distributed fashion. For instance, preference of one path over another may be based on the affinity preference order of the edge router and may be locally determined by the edge router, without input from the controller. Further, performing fast-failover may occur locally on the edge router in a distributed fashion, without input from the controller.

In some examples, the system may receive from a the one or more first gateways, a first prefix and a second prefix. The system may identify a third affinity number associated with the first prefix and a fourth affinity number associated with the second prefix. In some examples, the system may identify a policy associated with the one or more first gateways. The system may assign based at least in part on the policy, a fifth affinity number to the second prefix. In some examples, the third affinity number and the fourth affinity number comprise a same affinity number, and wherein the fifth affinity number is different from the same affinity number.

In some examples, the system comprises the services module described above. In some examples, the system may assign a third affinity number to one or more service routes. The system may receive a request to access a service associated with the edge router. The system may identify the third affinity number associated with the service. In some examples, the system may identify the affinity preference order associated with the edge router. The system may send, based at least in part on the third affinity number and affinity preference order, a second path to the edge router via a second route.

In this way, the system may utilize routing affinity to achieve a variety of networking related functionalities, including automatic load-balancing of traffic, provisioning of active and backup gateways, optimal route distribution to routers from routing controllers, optimized service placement for edge routers, without the need for any policy configuration at all, let alone complex policies.

Figure 5:
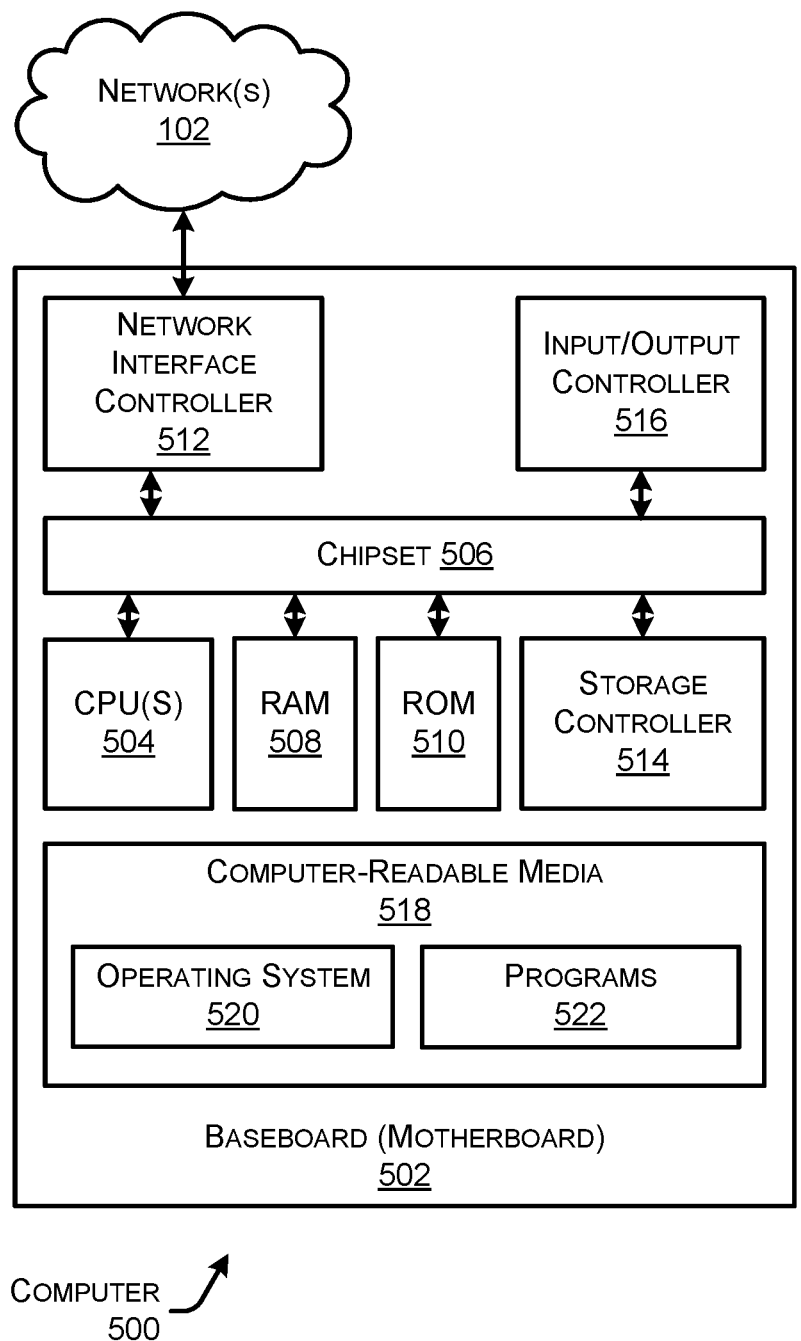
FIG. 5 is a computer architecture diagram showing an illustrative computer hardware architecture for implementing a device that can be utilized to implement aspects of the various technologies presented herein.

FIG. 5 shows an example computer architecture for a device capable of executing program components for implementing the functionality described above. The computer architecture shown in FIG. 5 illustrates any type of computer 500, such as a conventional server computer, workstation, desktop computer, laptop, tablet, network appliance, e-reader, smartphone, or other computing device, and can be utilized to execute any of the software components presented herein. The computer may, in some examples, correspond to a controller 116 and/or any other device described herein, and may comprise personal devices (e.g., smartphones, tables, wearable devices, laptop devices, etc.) networked devices such as servers, switches, routers, hubs, bridges, gateways, modems, repeaters, access points, and/or any other type of computing device that may be running any type of software and/or virtualization technology.

The computer 500 includes a baseboard 502, or "motherboard," which is a printed circuit board to which a multitude of components or devices can be connected by way of a system bus or other electrical communication paths. In one illustrative configuration, one or more central processing units ("CPUs") 504 operate in conjunction with a chipset 506. The CPUs 504 can be standard programmable processors that perform arithmetic and logical operations necessary for the operation of the computer 500.

The CPUs 504 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 506 provides an interface between the CPUs 504 and the remainder of the components and devices on the baseboard 502. The chipset 506 can provide an interface to a RAM 508, used as the main memory in the computer 500. The chipset 506 can further provide an interface to a computer-readable storage medium such as a read-only memory ("ROM") 510 or non-volatile RAM ("NVRAM") for storing basic routines that help to startup the computer 500 and to transfer information between the various components and devices. The ROM 510 or NVRAM can also store other software components necessary for the operation of the computer 500 in accordance with the configurations described herein.

The computer 500 can operate in a networked environment using logical connections to remote computing devices and computer systems through a network, such as network 102. The chipset 506 can include functionality for providing network connectivity through a NIC 512, such as a gigabit Ethernet adapter. The NIC 512 is capable of connecting the computer 500 to other computing devices over the network 102. It should be appreciated that multiple NICs 512 can be present in the computer 500, connecting the computer to other types of networks and remote computer systems.

The computer 500 can be connected to a storage device 518 that provides non-volatile storage for the computer. The storage device 518 can store an operating system 520, programs 522, and data, which have been described in greater detail herein. The storage device 518 can be connected to the computer 500 through a storage controller 514 connected to the chipset 506. The storage device 518 can consist of one or more physical storage units. The storage controller 514 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 500 can store data on the storage device 518 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 518 is characterized as primary or secondary storage, and the like.

For example, the computer 500 can store information to the storage device 518 by issuing instructions through the storage controller 514 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 500 can further read information from the storage device 518 by detecting the physical states or characteristics of one or more particular locations within the physical storage units.

In addition to the mass storage device 518 described above, the computer 500 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 500. In some examples, the operations performed by the controller 116 and/or any components included therein, may be supported by one or more devices similar to computer 500. Stated otherwise, some or all of the operations performed by the controller 116 and/or any components included therein, may be performed by one or more computer devices 500.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 518 can store an operating system 520 utilized to control the operation of the computer 500. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 518 can store other system or application programs and data utilized by the computer 500.

In one embodiment, the storage device 518 or other computer-readable storage media is encoded with computer-executable instructions which, when loaded into the computer 500, transform the computer from a general-purpose computing system into a special-purpose computer capable of implementing the embodiments described herein. These computer-executable instructions transform the computer 500 by specifying how the CPUs 504 transition between states, as described above. According to one embodiment, the computer 500 has access to computer-readable storage media storing computer-executable instructions which, when executed by the computer 500, perform the various processes described above with regard to FIGS. 1-4. The computer 500 can also include computer-readable storage media having instructions stored thereupon for performing any of the other computer-implemented operations described herein.

The computer 500 can also include one or more input/output controllers 516 for receiving and processing input from a number of input devices, such as a keyboard, a mouse, a touchpad, a touch screen, an electronic stylus, or other type of input device. Similarly, an input/output controller 516 can provide output to a display, such as a computer monitor, a flat-panel display, a digital projector, a printer, or other type of output device. It will be appreciated that the computer 500 might not include all of the components shown in FIG. 5, can include other components that are not explicitly shown in FIG. 5, or might utilize an architecture completely different than that shown in FIG. 5.

As described herein, the computer 500 may comprise one or more of a controller 116 and/or any other device. The computer 500 may include one or more hardware processors 504 (processors) configured to execute one or more stored instructions. The processor(s) 504 may comprise one or more cores. Further, the computer 500 may include one or more network interfaces configured to provide communications between the computer 500 and other devices, such as the communications described herein as being performed by the controller 116 and/or any other device. The network interfaces may include devices configured to couple to personal area networks (PANs), wired and wireless local area networks (LANs), wired and wireless wide area networks (WANs), SDWANs, and so forth. For example, the network interfaces may include devices compatible with Ethernet, Wi-Fi™, and so forth.

The programs 522 may comprise any type of programs or processes to perform the techniques described in this disclosure. For instance, the programs 522 may cause the computer 500 to perform techniques including assigning, to one or more first gateways in the network, a first affinity number; assigning to one or more second gateways in the network, a second affinity number; receiving, from an edge router in the network, an affinity preference order associated with the edge router, determining, based at least in part on the affinity preference order, a route associated with the first affinity number to send a path to the edge router; and sending, based at least in part on the determining, the path to the edge router via the route.

In this way, the computer 500 can ensure different branch (es) within the network may be configured to prefer a different hub, have a different affinity-preference-order, and have different load balancing. Thus, without requiring resource intensive and/or complex control policies to be configured by an administrator and/or a controller, the current techniques may automatically load-balance traffic (e.g., from edge routers and/or edge device(s)) across different gateways within the network. Further the system may utilize a lower the send-path-limit, while still ensuring that edge device(s) receive preferred routes, resulting in reduced memory and/or processing requirements of network device (s). As noted above, this may result in improved processing and resource availability within the network. Moreover, the system may avoid expensive computations in the routing controller during RIB-OUT processing. Further, the system may ensure that, always in a deterministic fashion, only the most relevant paths to the branch actually get sent out. Further, the system may provide improved flexibility such that the same hub can send routes with different affinities. Further, the affinities may be configured to be changed and/or defined at a prefix level or VPN level. Thus, this allows more flexible and granular affinity number assignment to routes.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method implemented at least in part by a controller of a network, the method comprising:
   assigning, to one or more first gateways in the network, a first affinity number, wherein first routes originating from the one or more first gateways are tagged with the first affinity number;
   assigning to one or more second gateways in the network, a second affinity number, wherein second routes originating from the one or more second gateways are tagged with the second affinity number;
   receiving, from an edge router in the network, an affinity preference order of the edge router, the affinity preference order including the first affinity number and indicating preferred routes of the edge router;
   determining, based at least in part on the affinity preference order of the edge router, at least one route tagged with the first affinity number of the one or more first gateways to send to the edge router;

sending, based at least in part on the determining, an indication of the at least one route to, the edge router; and refraining, based at least in part on the affinity preference order of the edge router, from sending indications of routes tagged with the second affinity number to the edge router.

2. The method of claim 1, further comprising:

grouping one or more inbound paths based at least in part on a respective affinity number associated with routes of each path to create one or more groups; and storing the one or more groups in a database associated with the network.

3. The method of claim 2, further comprising:

determining that the at least one route tagged with the first affinity number of the one or more first gateways is unavailable;

determining, based at least in part on a third affinity number being included in the affinity preference order, a second route associated with the third affinity number; and sending a second indication of the second route to the edge router.

4. The method of claim 1, further comprising:

receiving from the one or more first gateways, a first prefix and a second prefix;

identifying a third affinity number associated with the first prefix and a fourth affinity number associated with the second prefix;

identifying a policy associated with the one or more first gateways; and assigning, based at least in part on the policy, a fifth affinity number to the second prefix.

5. The method of claim 4, wherein the third affinity number and the fourth affinity number comprise a same affinity number, and wherein the fifth affinity number is different from the same affinity number.

6. The method of claim 1, further comprising:

assigning a third affinity number to one or more service routes;

receiving a request to access a service associated with the edge router;

identifying the third affinity number associated with the service;

identifying the affinity preference order associated with the edge router; and sending, based at least in part on the third affinity number and the affinity preference order, a second indication of a second route corresponding of the one or more service routes to the edge router.

7. The method of claim 1, wherein one or more affinity numbers are assigned to one or more tunneling interfaces.

8. The method of claim 1, further comprising:

sending, to the edge router, one or more second paths, wherein the one or more second paths comprise one or more affinities associated with the edge router based on the affinity preference order;

determining that a send-path-limit has been reached; and refraining from sending one or more third paths to the edge router based on the send-path-limit.

9. A system comprising:

one or more processors; and one or more non-transitory computer-readable media storing computer-executable instructions that, when executed by the one or more processors, cause the one or more processors to perform operations comprising:

assigning, to one or more first gateways in a network, a first affinity number, wherein first routes originating from the one or more first gateways are tagged with the first affinity number;

assigning to one or more second gateways in the network, a second affinity number, wherein second routes originating from the one or more second gateways are tagged with the second affinity number;

receiving, from an edge router in the network, an affinity preference order of the edge router, the affinity preference order including the first affinity number and indicating preferred routes of the edge router;

determining, based at least in part on the affinity preference order of the edge router, at least one route tagged with the first affinity number of the one or more first gateways to send to the edge router;

sending, based at least in part on the determining, an indication of the at least one route to the edge router; and refraining, based at least in part on the affinity preference order of the edge router, from sending indications of routes tagged with the second affinity number to the edge router.

10. The system of claim 9, the operations further comprising:

grouping one or more inbound paths based at least in part on a respective affinity number associated with routes of each path to create one or more groups; and storing the one or more groups in a database associated with the network.

11. The system of claim 10, the operations further comprising:

determining that the at least one route tagged with the first affinity number of the one or more first gateways is unavailable;

determining, based at least in part on a third affinity number being included in the affinity preference order, a second route associated with the third affinity number; and sending a second indication of the second route to the edge router.

12. The system of claim 9, the operations further comprising:

receiving from the one or more first gateways, a first prefix and a second prefix;

identifying a third affinity number associated with the first prefix and a fourth affinity number associated with the second prefix;

identifying a policy associated with the one or more first gateways; and assigning, based at least in part on the policy, a fifth affinity number to the second prefix.

13. The system of claim 12, wherein the third affinity number and the fourth affinity number comprise a same affinity number, and wherein the fifth affinity number is different from the same affinity number.

14. The system of claim 9, the operations further comprising:

assigning a third affinity number to one or more service routes;

receiving a request to access a service associated with the edge router;

identifying the third affinity number associated with the service;

identifying the affinity preference order associated with the edge router; and sending, based at least in part on the third affinity number and the affinity preference order, a second indication of a second route corresponding of the one or more service routes to the edge router.

15. The system of claim 9, wherein one or more affinity numbers are assigned to one or more tunneling interfaces.

16. The system of claim 9, the operations further comprising:
   sending, to the edge router, one or more second paths, wherein the one or more second paths comprise one or more affinities associated with the edge router based on the affinity preference order;
   determining that a send-path-limit has been reached; and
   refraining from sending one or more third paths to the edge router based on the send-path-limit.

17. One or more non-transitory computer-readable media storing computer-readable instructions that, when executed by one or more processors, cause the one or more processors to perform operations comprising:
   assigning, to one or more first gateways in a network, a first affinity number, wherein first routes originating from the one or more first gateways are tagged with the first affinity number;
   assigning to one or more second gateways in the network, a second affinity number, wherein second routes originating from the one or more second gateways are tagged with the second affinity number;
   receiving, from an edge router in the network, an affinity preference order of the edge router, the affinity preference order including the first affinity number and indicating preferred routes of the edge router;
   determining, based at least in part on the affinity preference order of the edge router, at least one route tagged with the first affinity number of the one or more first gateways to send to the edge router;
   sending, based at least in part on the determining, an indication of the at least one route to the edge router; and
   refraining, based at least in part on the affinity preference order of the edge router, from sending indications of routes tagged with the second affinity number to the edge router.

18. The one or more non-transitory computer-readable media of claim 17, the operations further comprising:
   grouping one or more inbound paths based at least in part on a respective affinity number associated with routes of each path to create one or more groups; and
   storing the one or more groups in a database associated with the network.

19. The one or more non-transitory computer-readable media of claim 18, the operations further comprising:
   determining that the at least one route tagged with the first affinity number of the one or more first gateways is unavailable;
   determining, based at least in part on a third affinity number being included in the affinity preference order, a second route associated with the third affinity number; and
   sending a second indication of the second route to the edge router.

20. The one or more non-transitory computer-readable media of claim 17, the operations further comprising:
   sending, to the edge router, one or more second paths, wherein the one or more second paths comprise one or more affinities associated with the edge router based on the affinity preference order;
   determining that a send-path-limit has been reached; and
   refraining from sending one or more third paths to the edge router based on the send-path-limit.

* * * * *